*J. A. Ayres,*
*Nicking Screws,*
Nº 68,592. Patented Sept. 10, 1867.
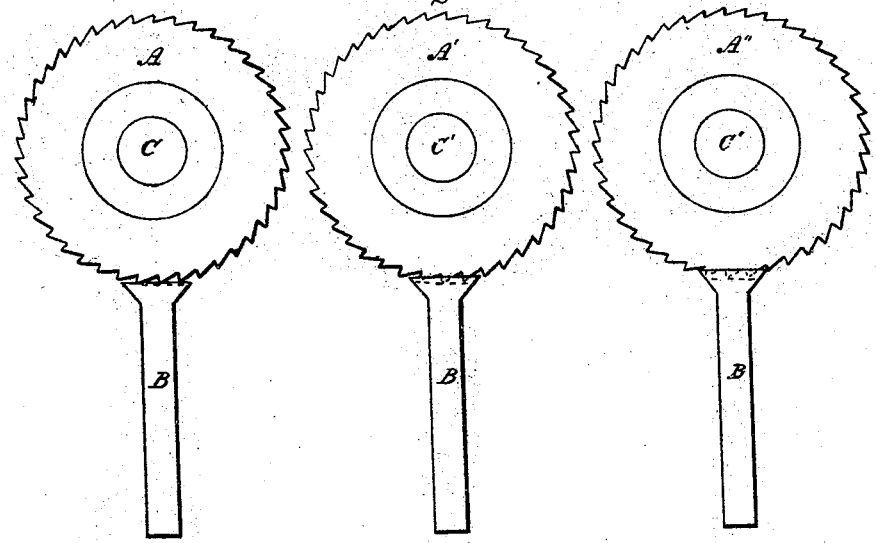
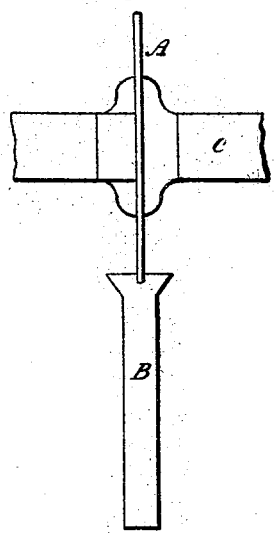
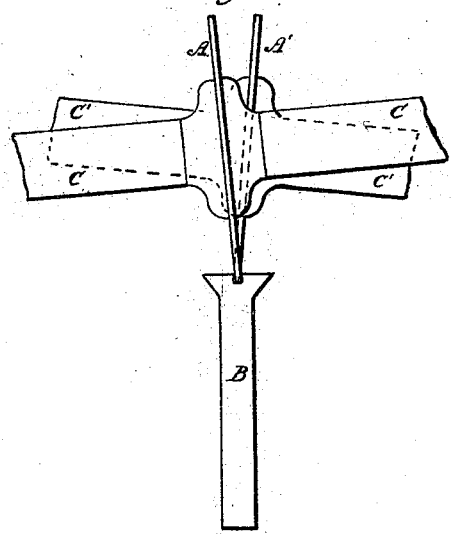
Witnesses:
Inventor:
J. A. Ayres

UNITED STATES PATENT OFFICE.

J. A. AYRES, OF HARTFORD, CONNECTICUT, ASSIGNOR TO NATIONAL SCREW COMPANY, OF SAME PLACE.

IMPROVED DEVICE FOR NICKING SCREWS.

Specification forming part of Letters Patent No. 68,592, dated September 10, 1867.

*To all whom it may concern:*

Be it known that I, JARED A. AYRES, of Hartford, in the county of Hartford and State of Connecticut, have invented a new and Improved Method of Nicking Screws or Screw-Blanks; and I do hereby declare that the following is a full, clear, and exact description of the same, reference being had to the accompanying drawings, and to the letters of reference marked thereon.

Figure 1 shows a side view of three saws, A A' A'', arranged so that each succeeding one cuts a little deeper into the nick in the head of the screw or screw-blank B. Fig. 2 shows an end view of the same when the saws are situated in the same plane. Fig. 3 shows an end view of two saws, A A', placed at an angle with each other, having their axes C C and C' C' inclined in such a manner that the saws cut a dovetailed slot in the head of the screw B.

My invention consists in using two or more saws in the operation of nicking or slotting screws, instead of but one, as is usually the case, whereby I can make a cleaner and better slot on account of the finishing-saw not being quickly dulled by taking a heavy chip, and can also make the slot or nick of a dovetailed or other desired form. Each saw also taking a much lighter shaving, the screw can be fed up to it much faster without danger of breaking or clogging. The saws also last much longer and require replacing less frequently.

The saws can all be set in the same plane, as shown in Fig. 1, and the end view, Fig. 2, cutting a square nick with parallel sides, or they can be arranged at an angle, so as to cut the sides of the nick at any desired angle, as shown in Fig. 3, forming a slot with inclined sides.

What I claim as my invention, and desire to secure by Letters Patent, is—

The use of two or more saws situated in different planes and operating successively upon the heads of screws or screw-blanks to form a dovetailed nick or slot, substantially as set forth.

J. A. AYRES.

Witnesses:
W. G. FITCH,
THEO. G. ELLIS.